(12) United States Patent
Zuo

(10) Patent No.: US 10,763,907 B2
(45) Date of Patent: Sep. 1, 2020

(54) CARD HOLDER APPARATUS FOR INSTALLING PHONE CARD

(71) Applicant: GUANGDONG OPPO MOBILE TELECOMMUNICATIONS CORP., LTD., Dongguan, Guangdong (CN)

(72) Inventor: Zhouquan Zuo, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 6 days.

(21) Appl. No.: 16/069,125

(22) PCT Filed: Apr. 21, 2017

(86) PCT No.: PCT/CN2017/081473
§ 371 (c)(1),
(2) Date: Jul. 10, 2018

(87) PCT Pub. No.: WO2017/181997
PCT Pub. Date: Oct. 26, 2017

(65) Prior Publication Data
US 2019/0013831 A1    Jan. 10, 2019

(30) Foreign Application Priority Data

Apr. 21, 2016 (CN) .................... 2016 2 0345175 U

(51) Int. Cl.
*H04B 1/3818* (2015.01)
*H04M 1/02* (2006.01)
(52) U.S. Cl.
CPC ............ *H04B 1/3818* (2015.01); *H04M 1/02* (2013.01)

(58) Field of Classification Search
CPC ............................... H04B 1/3818; H04M 1/02
USPC .......................................................... 455/558
See application file for complete search history.

(56) References Cited

U.S. PATENT DOCUMENTS

| 2003/0139077 | A1 | 7/2003 | Sasaki et al. |
| 2004/0132493 | A1* | 7/2004 | Lin ...................... G06K 7/0021 455/558 |
| 2006/0270455 | A1* | 11/2006 | Zuo ...................... G06K 7/0021 455/558 |

(Continued)

FOREIGN PATENT DOCUMENTS

| CN | 2699589 Y | 5/2005 |
| CN | 101686270 S | 3/2010 |

(Continued)

OTHER PUBLICATIONS

Machine translation of KR-20140066095-A (Year: 2014).*

(Continued)

*Primary Examiner* — Steven S Kelley
(74) *Attorney, Agent, or Firm* — Lathrop GPM LLP

(57) ABSTRACT

A card holder apparatus (100) for installing a phone card (200), and a mobile device are provided. The card holder apparatus (100) includes a card holder (1), a card groove (11) being defined inside the card holder (1); and an elastic member (2) provided to the card holder (1), at least a part of the elastic member (2) being located at at least one side wall of the card groove (11). The elastic member (2) is configured so that when the phone card (200) is placed into the card groove (11), the elastic member (2) is compressed so as to squeeze the phone card (200).

13 Claims, 3 Drawing Sheets

(56) References Cited

U.S. PATENT DOCUMENTS

2013/0252470 A1    9/2013   Lin et al.
2015/0303963 A1* 10/2015   Zheng .................. H04B 1/3816
                                                                                455/558

FOREIGN PATENT DOCUMENTS

| CN | 201928323 U | | 8/2011 | |
|---|---|---|---|---|
| CN | 202455404 U | | 9/2012 | |
| CN | 202503571 U | | 10/2012 | |
| CN | 202585944 U | | 12/2012 | |
| CN | 202840165 U | | 3/2013 | |
| CN | 103138105 A | | 6/2013 | |
| CN | 104158018 A | | 11/2014 | |
| CN | 204156915 U | * | 2/2015 | |
| CN | 104518304 A | * | 4/2015 | |
| CN | 104752893 A | | 7/2015 | |
| CN | 204652447 U | | 9/2015 | |
| CN | 105763686 A | | 7/2016 | |
| CN | 205610708 U | | 9/2016 | |
| EP | 1182743 A1 | | 2/2002 | |
| JP | 2007060445 A | | 3/2007 | |
| JP | 2015011954 A | | 1/2015 | |
| KR | 20140066095 A | * | 5/2014 | |
| WO | WO 2011/081870 | * | 7/2011 | ............. H01R 12/71 |

OTHER PUBLICATIONS

Machine translation of CN-104518304-A (Year: 2015).*
https://5gstore.com/product/3911_verizon-3g-4g-sim-card.html %GSTore webpage offering a "Verizon Triple Punch SIM Card" with the "General" tab visible (Year: 2018).*
https://5gstore.com/product/3911_verizon-3g-4g-sim-card.html %GSTore webpage offering a "Verizon Triple Punch SIM Card" with the "Customer Reviews" tab visible (Year: 2018).*
Machine translation of CN204156915 (Year: 2015).*
PCT/CN2017/081473 International Search Report and Written Opinion dated May 31, 2017, 7 pages.
PCT/CN2017/081473 English translation of the International Search Report dated Mary 31, 2017, 3 pages.
European Patent Application No. 17785481.7 extended search and Opinion dated Oct. 12, 2018, 7 pages.
Japanese Patent Application No. 2018-536743 Office Action dated Sep. 10, 2019, 3 pages.
Japanese Patent Application No. 2018-536743 English translation of Office Action dated Sep. 10, 2019, 3 pages.
Indian Patent Application No. 201837025178 Office Action dated Apr. 20, 2020, 8 pages.

* cited by examiner

CARD HOLDER APPARATUS FOR INSTALLING PHONE CARD

CROSS-REFERENCE TO RELATED APPLICATION

The present application is a national phase entry under 35 USC § 371 of International Application PCT/CN2017/081473, filed Apr. 21, 2017, which claims the benefit of and priority to Chinese Patent Application No. 201610254731.8 filed Apr. 21, 2016 and No. 201620345175.0 filed Apr. 21, 2016, the entire disclosures of which are incorporated herein by reference.

FIELD

The present disclosure relates to a technical field of mobile devices, and more particularly, to a card holder apparatus for installing a phone card.

BACKGROUND

A mobile device is usually equipped with a card holder to facilitate placement of a phone card. However, due to a tolerance in a size of the phone card, the phone card may fail to be placed into the card holder. In order to avoid that situation, a size of a card groove of the card holder is usually larger than the size of the phone card, and the phone card is loose in the card holder, such that the phone card cannot be stably placed in the card holder when a user replaces the phone card, and the phone card is easily misaligned or dropped, resulting in a poor user experience of replacing the phone card.

SUMMARY

A card holder apparatus according to embodiments of the present disclosure includes a card holder defining a card groove therein; and an elastic member provided to the card holder and having at least a part located at at least one side wall of the card groove. The elastic member is configured to be compressed to squeeze the phone card when the phone card is placed in the card groove.

A card holder apparatus according to embodiments of the present disclosure includes a card holder defining a card groove therein; and an elastic member located at a side wall of the card groove. The elastic member is provided with a protruding portion protruding towards an interior of the card groove, and when the phone card is placed in the card groove, the protruding portion is compressed to squeeze the phone card.

A card holder apparatus according to embodiments of the present disclosure includes a card holder defining a rectangular or square card groove therein; and an elastic member including a mating portion. The mating portion is located at a side wall of the card groove, and when the phone card is placed in the card groove, the mating portion is compressed to squeeze the phone card.

DETAILED DESCRIPTION

Figure 1:
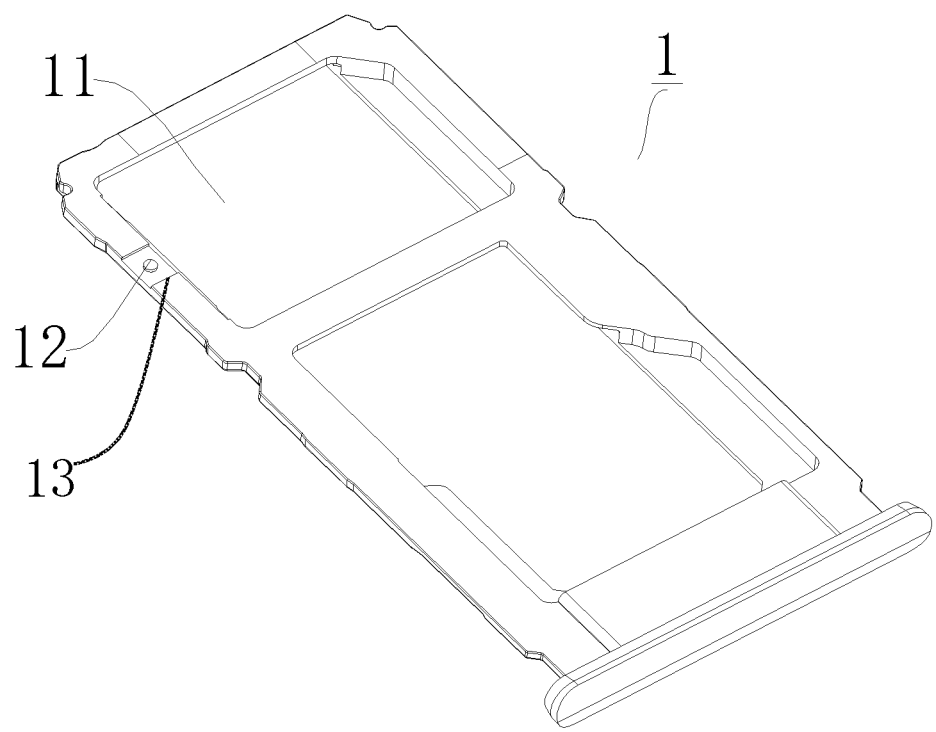
FIG. 1 illustrates a structural schematic view of a card holder according to some embodiments of the present disclosure.

Embodiments of the present disclosure will be described in detail, and examples of the embodiments will be illustrated in accompanying drawings. The embodiments described with reference to the drawings are exemplary, aim to interpret the present disclosure and is not intended to limit the present disclosure.

In the specification, it is to be understood that terms such as "length," "width," "thickness," "upper," "lower," "front," "rear," "left," "right," "vertical," "horizontal," "top," "bottom," "inner," and "outer" should be construed to refer to the orientation or position as then described or as shown in the drawings under discussion. These relative terms are for convenience of description and do not imply or indicate that the present invention must have or be constructed or operated in a particular orientation. Thus, these relative terms shall not be constructed to limit the present disclosure. In the description of the present disclosure, "a plurality of" means at least two, such as two, three, etc., unless specified otherwise.

In the present disclosure, unless specified or limited otherwise, the terms "installed," "connected," "coupled," "fixed" and the like are used broadly, and may be, for example, fixed connections, detachable connections, or integral connections; may also be mechanical or electrical connections, or may be mutual communication; may also be direct connections or indirect connections via intervening structures; may also be inner communications or interaction of two elements, which can be understood by those skilled in the art according to specific situations.

A card holder apparatus 100 for installing a phone card 200 according to embodiments of the present disclosure will be described below with reference to FIGS. 1-6. The card holder apparatus 100 can be applied to a mobile device, for example, a mobile phone, to install the phone card 200.

As illustrated in FIGS. 1-4, the card holder apparatus 100 for installing the phone card 200 according to embodiments can include a card holder 1 and an elastic member 2. The phone card 200 can be installed on the card holder 1.

Specifically, the card holder 1 defines a card groove 11 therein, and the phone card 200 can be accommodated in the card groove 11. It could be understood herein that the shape of the card groove 11 is substantially consistent with the shape of the phone card 200. For example, as illustrated in FIG. 1 and FIGS. 3-5, the phone card 200 is formed in a substantially rectangular or square shape, and the card groove 11 is formed in a rectangular or square shape.

The elastic member 2 is provided to the card holder 1, and at least a part of the elastic member 2 is located at at least one side wall of the card groove 11. Thus, it is unnecessary to change the structure and size of an existing card holder, and the arrangement of the elastic member 2 does not occupy any extra space of the card holder 1. The structure is simple and compact.

Specifically, the elastic member 2 is configured to be compressed to squeeze the phone card 200 when the phone card 200 is placed in the card groove 11. For example, as illustrated in FIGS. 3-6, at least a part of the elastic member 2 is located at one side wall of the card groove 11, and when the phone card 200 is installed in the card groove 11, the part of the elastic member 2 located at the one side wall of the card groove 11 is compressed to squeeze the phone card 200. Certainly, the present disclosure is not limited thereto. In other embodiments, at least a part of the elastic member 2 can also be located at adjacent two side walls of the card groove 11, and when the phone card 200 is installed in the card groove 11, the part of the elastic member 2 located at the adjacent two side walls of the card groove 11 is compressed respectively to squeeze the phone card 200. Thus, it is possible to solve the problem that the phone card 200 is loose in the card groove 11 effectively, and prevent the phone card 200 from deviating from or falling off the card groove 11 when the user replaces the phone card 200, thereby bringing about a quick, safe and secure operation experience of replacing the phone card 200, and improving practicability.

For the card holder apparatus 100 for installing the phone card 200 according to embodiments of the present disclosure, by providing the elastic member 2 to the card holder 1 and positioning at least a part of the elastic member 2 in at least one side wall of the card groove 11, the elastic member 2 can be compressed to squeeze the phone card 200 when the user installs the phone card 200 in the card groove 11. Thus, not only the structure is simple, but also the problem that the phone card 200 is loose in the card groove 11 can be solved effectively, so as to prevent the phone card 200 from deviating from or falling off the card groove 11 when the user replaces the phone card 200, and bring about the quick, safe and secure operation experience of replacing the phone card 200, and improve practicability.

Figure 2:
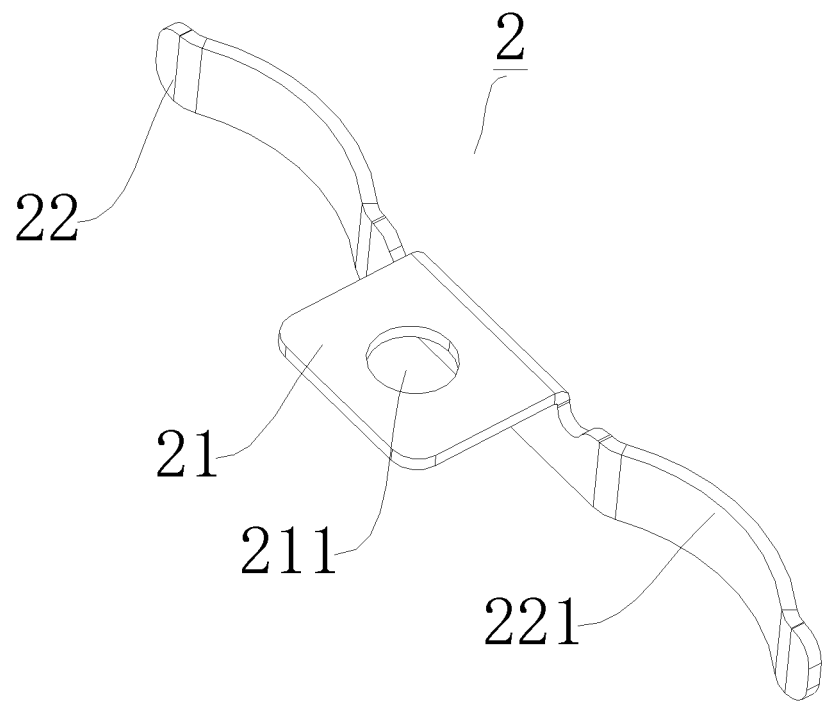
FIG. 2 illustrates a structural schematic view of an elastic member according to some embodiments of the present disclosure.

In some embodiments of the present disclosure, as illustrated in FIG. 2, the elastic member 2 includes a fixing portion 21 and a mating portion 22. The fixing portion 21 is provided to the mating portion 22, and the fixing portion 21 is provided on an end surface of the card holder 1 outside the card groove 11. The mating portion 22 is located at the side wall of the card groove 11. When the phone card 200 is placed in the card groove 11, the mating portion 22 is compressed to squeeze the phone card 200. Thus, the structure is simple and reliable.

Further, the card holder 1 is provided with one of a projecting portion and a fixing hole, while the fixing portion 21 is provided with the other one of the projecting portion and the fixing hole. The projecting portion is fitted with the fixing hole to fix the elastic member 2 to the card holder 1, which thus is simple and reliable. Specifically, as illustrated in FIGS. 1 and 2, the card holder 1 is provided with the projecting portion 12, the fixing portion 21 is provided with the fixing hole 211, and the fixing hole 211 in the fixing portion 21 is fitted with the projecting portion 12 on the card holder 1, thereby realizing the fixation of the card holder 1 and the elastic member 2.

Certainly, the present disclosure is not limited thereto. In other embodiments, the card holder 1 and the fixing portion 21 can be fixed in other manners. For example, the fixing portion 21 is coupled to the card holder 1 by welding to fix the elastic member 2 to the card holder 1.

In some other embodiments of the present disclosure, the elastic member 2 can be glued to the side wall of the card groove 11, thereby achieving the fixation of the elastic member 2. Certainly, the present disclosure is not limited thereto. In other embodiments, the side wall of the card groove 11 can be further provided with a mounting slot (not illustrated), and the elastic member 2 is installed in the mounting slot, such that the elastic member 2 is fixed to the card holder 1.

In some embodiments of the present disclosure, as illustrated in FIG. 2, the part of the elastic member 2 located at the side wall of the card groove 11 is formed into a long strip-shaped plate, which thus is simple and reliable. Specifically, a plate-shaped part of the elastic member 2 located at the side wall of the card groove 11 is provided with the protruding portion 221 protruding towards the phone card 200, and when the phone card 200 is placed in the card groove 11, the protruding portion 221 is compressed to squeeze the phone card 200.

In at least one embodiment, the part of the elastic member 2 located at the side wall of the card groove 11 has a length at least two thirds of the length of the corresponding side wall of the card groove 11. Hence, when the phone card 200 is placed in the card groove 11, a contact area between the elastic member 2 and the phone card 200 is advantageously increased, such that the elastic member 2 can be reliably compressed to squeeze the phone card 200 firmly.

The structure of the card holder apparatus 100 for installing the phone card 200 according to a specific embodiment will be described in detail with reference to FIGS. 1-6.

As illustrated in FIGS. 1-4, the card holder apparatus 100 for installing the phone card 200 according to this embodiment includes a card holder 1 and an elastic member 2. The card holder 1 defines a card groove 11 therein. The elastic member 2 is provided to the card holder 1, and at least a part of the elastic member 2 is located at one side wall of the card groove 11. The elastic member 2 is configured to be compressed to squeeze the phone card 200 when the phone card 200 is placed in the card groove 11.

Specifically, as illustrated in FIG. 2, the elastic member 2 includes a fixing portion 21 and a mating portion 22. The fixing portion 21 is provided to the mating portion 22, and the fixing portion 21 is provided on an end surface of the card holder 1 outside the card groove 11. The mating portion 22 is located at the side wall of the card groove 11. When the phone card 200 is placed in the card groove 11, the mating portion 22 is compressed to squeeze the phone card 200. Thus, the structure is simple and reliable.

Further, as illustrated in FIGS. 1 and 2, the card holder 1 is provided with a projecting portion 12, the fixing portion 21 is provided with a fixing hole 211, and the fixing hole 211 in the fixing portion 21 is fitted with the projecting portion 12 on the card holder 1, thereby realizing the fixation of the card holder 1 and the elastic member 2.

As illustrated in FIG. 2, the part of the elastic member 2 located at the side wall of the card groove 11, i.e. the mating portion 22, is formed into a long strip-shaped plate, which thus is simple and reliable.

The part of the elastic member 2 located at the side wall of the card groove 11, i.e. the mating portion 22, has a length at least two thirds of the length of the corresponding side wall of the card groove 11. Hence, when the phone card 200 is placed in the card groove 11, a contact area between the elastic member 2 and the phone card 200 is advantageously increased, such that the elastic member 2 can be reliably compressed to squeeze the phone card 200 firmly.

As illustrated in FIGS. 1-4, the card holder apparatus 100 for installing the phone card 200 according to embodiments can include a card holder 1 defining a card groove 11 therein; and an elastic member 2 located at a side wall of the card groove 11. The elastic member 2 is provided with a protruding portion 221 protruding towards an interior of the card groove 11, and when the phone card 200 is placed in the card groove 11, the protruding portion 221 is compressed to squeeze the phone card 200.

In some embodiments, the elastic member 2 is formed into a strip-shaped plate along the side wall of the card groove 11.

For the card holder apparatus 100 for installing the phone card 200 according to embodiments of the present disclosure, by locating the elastic member 2 at a side wall of the card groove 11 and providing the elastic member 2 with the protruding portion 221 protruding towards the interior of the card groove 11, the protruding portion 221 can be compressed to squeeze the phone card 200 when the user installs the phone card 200 in the card groove 11. Thus, not only the structure is simple, but also the problem that the phone card 200 is loose in the card groove 11 can be solved effectively, so as to prevent the phone card 200 from deviating from or falling off the card groove 11 when the user replaces the phone card 200, and bring about the quick, safe and secure operation experience of replacing the phone card 200, and improve practicability.

As illustrated in FIGS. 1-4, the card holder apparatus 100 for installing the phone card 200 according to embodiments can include a card holder 1 defining a rectangular or square card groove 11 therein; and an elastic member 2 including a mating portion 22. The mating portion 22 is located at a side wall of the card groove 11, and when the phone card 200 is placed in the card groove 11, the mating portion 22 is compressed to squeeze the phone card 200.

In some embodiments, the mating portion 22 is formed into a long strip-shaped plate along the side wall of the card groove 11.

In some embodiments, the mating portion 22 is provided at each end of the mating portion 22 with a protruding portion 221 protruding towards an interior of the card groove 11, and when the phone card 200 is placed in the card groove 11, the protruding portion 221 is compressed to squeeze the phone card 200.

Figure 3:
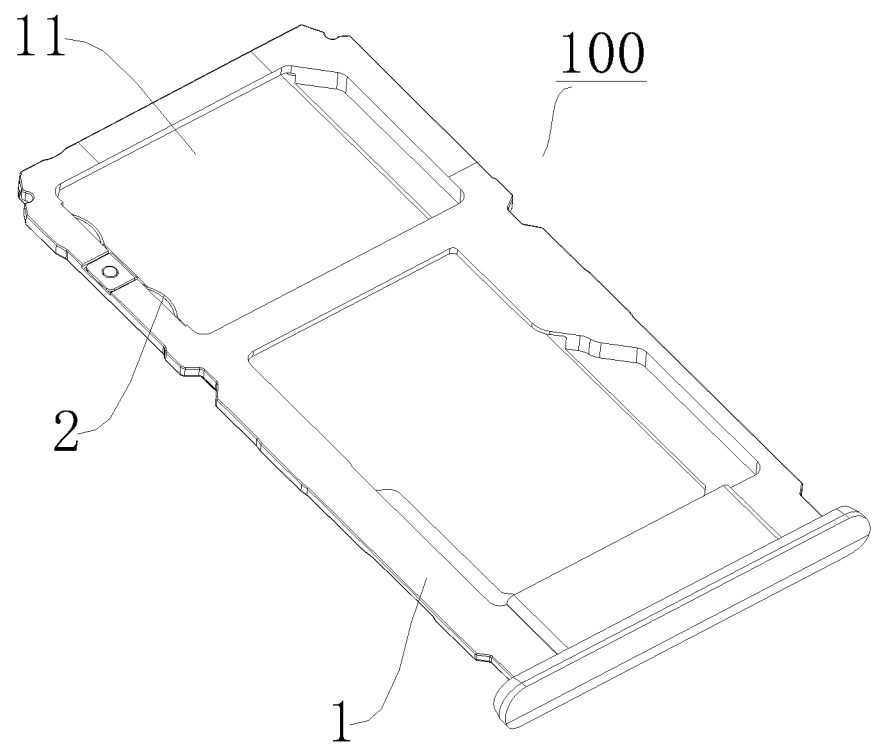
FIG. 3 illustrates a structural schematic view of a card holder apparatus according to some embodiments of the present disclosure.
Figure 4:
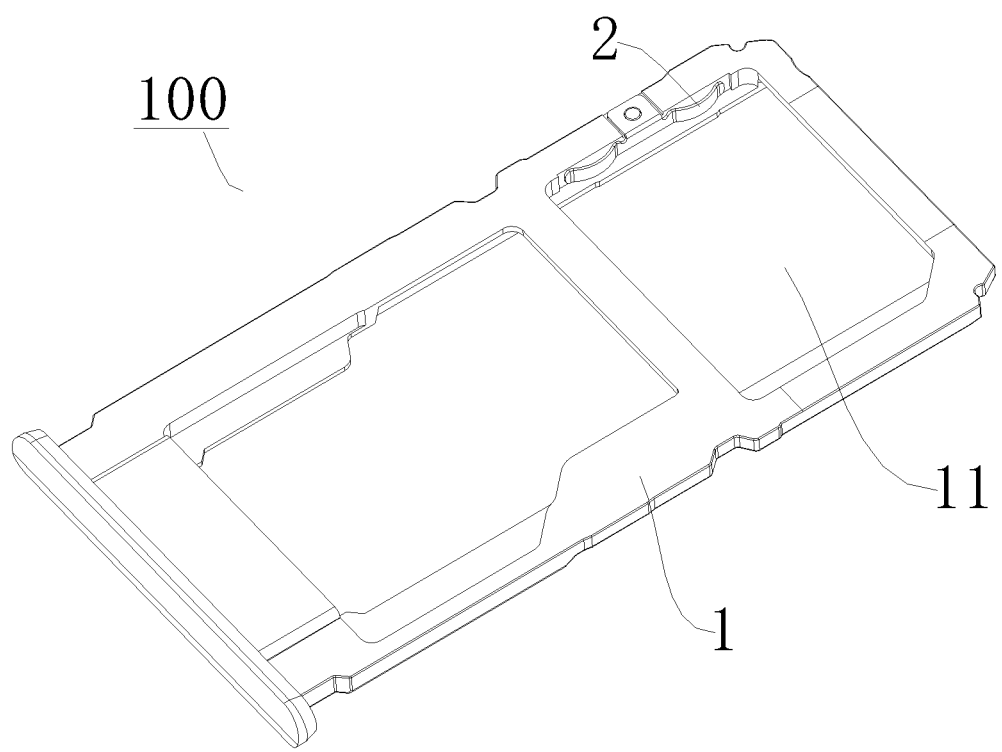
FIG. 4 illustrates a structural schematic view of a card holder apparatus in another direction according to some embodiments of the present disclosure.
Figure 5:
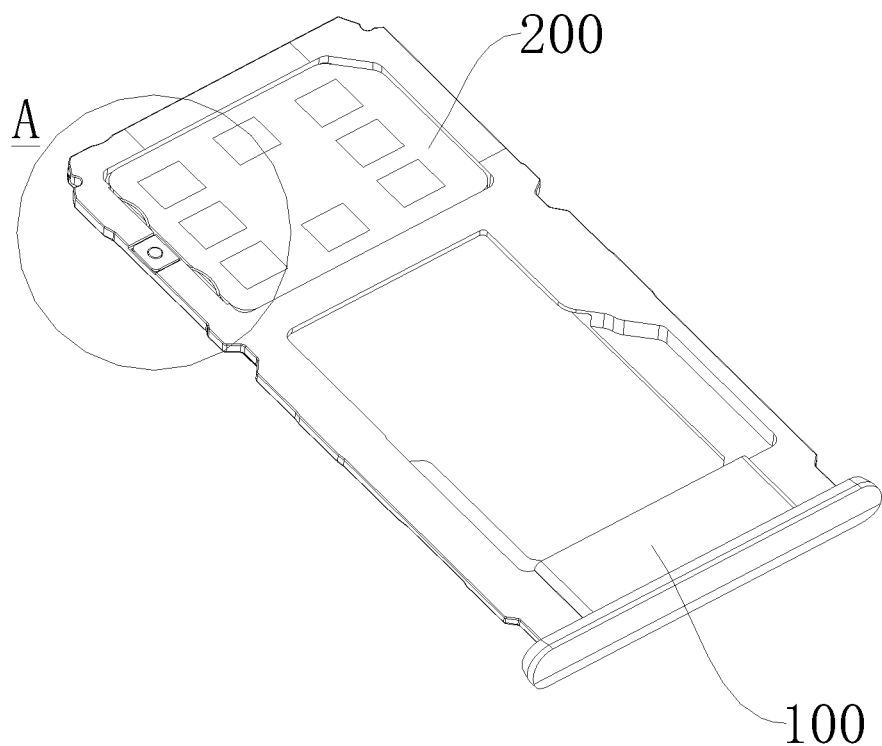
FIG. 5 illustrates an assembly schematic view of a card holder apparatus and a phone card according to some embodiments of the present disclosure.
Figure 6:
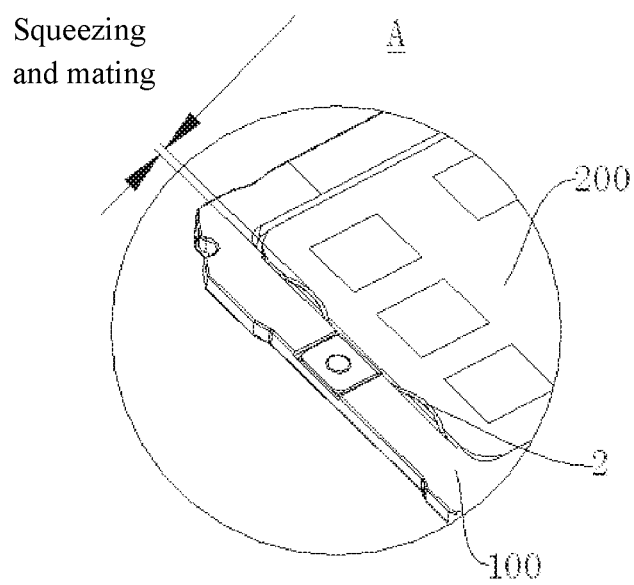
FIG. 6 illustrates an enlarged view of part A circled in FIG. 5.

In some embodiments, the elastic member 2 further includes a fixing portion 21 provided on an end surface of the card holder 1 outside the card groove 11. As illustrated in FIG. 1, the end surface of the card holder 1 outside the card groove 11 defines a receiving groove 13, the receiving groove 13 is in communication with the card groove 11; and as illustrated in FIG. 3, the fixing portion 21 is received in the receiving groove 13.

In some embodiments, the fixing portion 21 is coupled to a middle position of the mating portion 22.

For the card holder apparatus 100 for installing the phone card 200 according to embodiments of the present disclosure, by providing the elastic member 2 and locating the mating portion 22 of the elastic member 2 at a side wall of the card groove 11, the mating portion 22 can be compressed to squeeze the phone card 200 when the user installs the phone card 200 in the card groove 11. Thus, not only the structure is simple, but also the problem that the phone card 200 is loose in the card groove 11 can be solved effectively, so as to prevent the phone card 200 from deviating from or falling off the card groove 11 when the user replaces the phone card 200, and bring about the quick, safe and secure operation experience of replacing the phone card 200, and improve practicability.

A mobile device according to embodiments of the present disclosure includes the above card holder apparatus 100 for installing the phone card 200.

For the mobile device according to embodiments of the present disclosure, by providing the above card holder apparatus 100 for installing the phone card 200, not only the structure is simple, but also the problem that the phone card 200 is loose in the card groove 11 can be solved effectively, so as to prevent the phone card 200 from deviating from or falling off the card groove 11 when the user replaces the phone card 200, and bring about the quick, safe and secure operation experience of replacing the phone card 200, and improve practicability.

Reference throughout this specification to "one embodiment," "some embodiments," "an example," "a specific example" or "some examples" means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been illustrated and described, it would be appreciated by those skilled in the art that the embodiments are explanatory and cannot be construed to limit the present disclosure, and changes, modifications, alternatives and variations can be made in the embodiments without departing from the scope of the present disclosure.

What is claimed is:

1. A mobile phone SIM card holder apparatus for installing a mobile phone SIM card, comprising:
   a SIM card holder defining a card groove therein; and
   an elastic member detachably provided to the SIM card holder and having at least a part located at at least one side wall of the card groove,
   wherein the elastic member comprises a fixing portion and a mating portion, the fixing portion includes a hole and is provided on a projecting portion of an end surface of the SIM card holder outside the card groove, the mating portion is located in the card groove and at a side wall surface of the card groove and configured to squeeze the mobile phone SIM card when the mobile phone SIM card is placed in the card groove; and the end surface of the SIM card holder is perpendicular to the side wall surface of the card groove,
   wherein the end surface of the SIM card holder outside the card groove defines a receiving groove in communication with the card groove, and the fixing portion is received in the receiving groove;
   wherein the mating portion has two opposite ends, each of the two opposite ends is provided with a protruding portion protruding towards an interior of the card groove;
   wherein each of the two opposite ends of the mating portion are long strip-shaped plates;
   wherein the length of the two opposite ends of the mating portion is at least two thirds of a length of the corresponding side wall of the card groove.

2. The mobile phone SIM card holder apparatus according to claim 1, wherein at least a part of the elastic member is located at one side wall of the card groove.

3. The mobile phone SIM card holder apparatus according to claim 1, wherein at least a part of the elastic member is located at adjacent two side walls of the card groove.

4. The mobile phone SIM card holder apparatus according to claim 1, wherein the fixing portion is coupled to the card holder by welding.

5. The mobile phone SIM card holder apparatus according to claim 1, wherein the elastic member is glued to the side wall of the card groove.

6. The mobile phone SIM card holder apparatus according to claim 1, wherein the card groove is formed in a rectangular or square shape.

7. The mobile phone SIM card holder apparatus according to claim 1, wherein a shape of the card groove is substantially consistent with a shape of the mobile phone SIM card.

8. A mobile phone SIM card holder apparatus for installing a mobile phone SIM card, comprising:
 a SIM card holder defining a card groove therein; and
 an elastic member detachably provided to the SIM card holder and located at a side wall of the card groove, the elastic member being provided with a protruding portion protruding towards an interior of the card groove, and when the mobile phone SIM card is placed in the card groove,
 wherein the elastic member further comprises a fixing portion and a mating portion, the fixing portion includes a hole and is provided on a projection portion of an end surface of the SIM card holder outside the card groove, the mating portion is located in the card groove and at a side wall surface of the card groove and configured to squeeze the mobile phone SIM card when the mobile phone SIM card is placed in the card groove; and the end surface of the SIM card holder is perpendicular to the side wall surface of the card groove,
 wherein the end surface of the SIM card holder outside the card groove defines a receiving groove in communication with the card groove, and the fixing portion is received in the receiving groove;
 wherein the mating portion has two opposite ends, each of the two opposite ends is provided with the protruding portion protruding towards the interior of the card groove;
 wherein each of the two opposite ends of the mating portion are long strip-shaped plates;
 wherein the length of the two opposite ends of the mating portion is at least two thirds of a length of the corresponding side wall of the card groove.

9. The mobile phone SIM card holder apparatus according to claim 8, wherein the elastic member is formed into a strip-shaped plate along the side wall of the card groove.

10. A mobile phone SIM card holder apparatus for installing a mobile phone SIM card, comprising:
 a SIM card holder defining a rectangular or square card groove therein; and
 an elastic member detachably provided to the SIM card holder, the elastic member comprising a mating portion and a fixing portion, the fixing portion includes a hole and being provided on a projecting portion of an end surface of the SIM card holder outside the card groove, the mating portion being located in the card groove and at a side wall surface of the card groove and configured to squeeze the mobile phone SIM card when the mobile phone SIM card is placed in the card groove; and the end surface of the SIM card holder being perpendicular to the side wall surface of the card groove,
 wherein the end surface of the SIM card holder outside the card groove defines a receiving groove in communication with the card groove, and the fixing portion is received in the receiving groove;
 wherein the mating portion has two opposite ends, each of the two opposite ends is provided with a protruding portion protruding towards an interior of the card groove, and when the mobile phone SIM card is placed in the card groove, each protruding portion is compressed to squeeze the mobile phone SIM card;
 wherein each of the two opposite ends of the mating portion are long strip-shaped plates;
 wherein the length of the two opposite ends of the mating portion is at least two thirds of a length of the corresponding side wall of the card groove.

11. The mobile phone SIM card holder apparatus according to claim 10, wherein the mating portion is formed into a long strip-shaped plate along the side wall of the card groove.

12. The mobile phone SIM card holder apparatus according to claim 11, wherein the elastic member further comprises a fixing portion provided on an end surface of the SIM card holder outside the card groove.

13. The mobile phone SIM card holder apparatus according to claim 10, wherein the fixing portion is coupled to a middle position of the mating portion.

* * * * *

UNITED STATES PATENT AND TRADEMARK OFFICE
CERTIFICATE OF CORRECTION

PATENT NO. : 10,763,907 B2  
APPLICATION NO. : 16/069125  
DATED : September 1, 2020  
INVENTOR(S) : Zhouquan Zuo Page 1 of 1

It is certified that error appears in the above-identified patent and that said Letters Patent is hereby corrected as shown below:

On the Title Page

Item (30), Foreign Application Priority Data:
"Apr. 21, 2016 (CN) ..................... 2016 2 045175 U"

Should Read:
-- Apr. 21, 2016 (CN) ..................... 2016 2 0345175 U
Apr. 21, 2016 (CN) ..................... 201610254731.8 --

Signed and Sealed this
Twenty-second Day of December, 2020

Andrei Iancu
*Director of the United States Patent and Trademark Office*